3,582,352
PREPARATION OF QUICK-COOKING RICE
Katsuharu Yasumatsu, Toyonaka, and Koshichi Sawada and Shintaro Moritaka, Suita, Japan, assignors to Takeda Chemical Industries, Ltd., Higashi-ku, Osaka, Japan
No Drawing. Filed Sept. 16, 1968, Ser. No. 760,065
Claims priority, application Japan, Sept. 22, 1968, 42/60,969
Int. Cl. A23l 1/10
U.S. Cl. 99—80PS    8 Claims

ABSTRACT OF THE DISCLOSURE

A quick-cooking rice is prepared by soaking raw white rice in an aqueous medium, steaming the soaked rice for a specified short time, soaking the partially gelatinized rice in an aqueous medium and applying an edible oil and/or a surfactant to the rice, again steaming the soaked rice until it is completely gelatinized, drying the gelatinized grains in a hot air stream and expanding the dried grains with an air stream at a more elevated temperature.

---

This invention relates to a preparation of quick-cooking rice. More particularly, this invention relates to a process for preparing a quick-cooking rice of exceptionally desirable properties and which is ready for serving in a few minutes.

Rice is recognized to be a valuable foodstuff and used throughout the world. However, the ordinary white rice has the disadvantage that its cooking requires a considerably long period of time and some degree of skill on the part of the cook.

The disadvantage of ordinary white rice has long been recognized and many methods have been proposed to prepare a quick-cooking rice which can be converted to a dish of cooked rice in a brief period of time. However, none of these prior techniques is really satisfactory from the practical point of view. That is, in most of these prior methods the products require a relatively long period of time for rehydration or additional cooking because they are not completely gelatinized. Another disadvantage of these techniques is that the products contain a large amount of misshapen or broken grains. Among the prior techniques, Roberts method (U.S. Pat. 2,715,579) can be considered to be a relatively excellent one because it is not accompanied with the said two disadvantages. But, the said method involves the gelatinization of the rice grains by a steam treatment under superatmospheric pressure and this treatment inevitably causes browning of the grains. This makes the product unattractive in appearance and lowers the commercial value of the same in the open market.

One object of the present invention is to provide a process for preparing quick-cooking rice which is not accompanied with the said disadvantages. Another object of the present invention is to provide a quick-cooking rice which is attractive in appearance and can be quickly served for the table with deliciousness of satisfactorily cooked rice.

The said objects are realized by subjecting raw white rice to a particular sequence of steps, i.e. soaking raw white rice in an aqueous medium (Step 1), subjecting the soaked rice to the first steaming for a specified brief period of time (Step 2), soaking the partially gelatinized rice in an aqueous medium to give a specified moisture content of the rice and applying in this step a specified amount of an edible oil and/or a surfactant to the rice (Step 3), again subjecting thus-soaked rice to steaming until it is completely gelatinized (Step 4), drying the gelatinized grains to a certain extent in a hot air stream (Step 5), and expanding the dried grains by the action of a stream of air at a more elevated temperature (Step 6).

According to the method of this invention, any variety of rice such as the short-grain, medium-grain, long-grain or wild variety may be employed as the material.

The raw white rice is first soaked in an aqueous medium (Step 1). The soaking may be carried out at room temperature (e.g. about 10° to about 30° C.) or at a somewhat elevated temperature of about 30° to 50° C. so as to accelerate hydration of the rice grains. It gives best results to continue the soaking until the moisture content of the rice grains falls within a range from about 25 to about 35%. In general, the said moisture content range may be attained by soaking the white rice in an aqueous medium for about 0.5 to about 16 hours. The aqueous medium is water or an aqueous solution or a mixture containing any desirable additives such as flavoring agents e.g. sodium chloride, monosodium glutamate, disodium 5'-ribonucleotide, water-soluble vitamins e.g. thiamine, sulfur-containing amino acids e.g. cysteine, cystine. It is advantageous from the viewpoint of rehydration of the product to soak the rice in an aqueous medium containing a chelating agent such as citric acid or its edible salt (e.g. sodium citrate), or a molecularly dehydrated phosphoric acid (e.g. pyrophosphoric acid, polyphosphoric acid, metaphosphoric acid) or its edible salt (e.g. sodium salt) in an amount of about 0.01% to about 2%.

The soaked rice is then completely gelatinized. According to the method of this invention, the complete gelatinization of the starch in the rice grains is attained by the following particular sequence of steps.

The soaked rice is first steamed under atmospheric pressure for about 5 minutes to 1 hour (Step 2). Thus partially gelatinized rice is again soaked in an aqueous medium and in this soaking step the rice is allowed to absorb an edible oil and/or a surfactant as well as water (Step 3). As the edible oil to be employed in the method of this invention, those oils commonly used for foods can be employed, irrespective of whether they are of the animal or of the vegetable origin. For instance, there may be employed soy bean oil, cotton seed oil, sesame oil, corn oil, rice bran oil, lard, beef tallow and the like. As the surfactants to be employed, such surfactants as glycerine fatty acid esters, sorbitan fatty acid esters, sucrose fatty acid esters and the like are enumerated by way of examples, but any of other surfactant commonly employed can be used so long as they are edible and do not have unpleasant odor or taste. This soaking may be carried out by soaking the rice directly in an aqueous emulsion of the edible oil and/or the surfactant, or by soaking the rice first in water and subsequently in an aqueous emulsion of the edible oil and/or the surfactant. In both cases, the soaking is continued until the moisture content of the rice falls within a range of about 45 to about 59%, more advantageously about 50 to 55%, while, the amount of the edible oil and/or the surfactant absorbed on the rice is about 0.03 to about 3%, more advantageously about 0.1 to about 1%. In practice, the rice is directly soaked in an aqeuous emulsion containing about 0.1 to about 10%, preferably about 0.3 to about 3%, of the edible oil and/or the surfactant for about 1 to 10 minutes. This soaking is carried out at a room temperature or somewhat elevated temperature e.g. about 70° C. The aqueous medium i.e. the aqueous emulsion or the water may contain, upon necessity, any desirable additives such as flavoring agents, water-soluble vitamins, sulfur-containing amino acids, chelating agents.

Thus-soaked rice is again steamed under atmospheric pressure (Step 4). By this second steaming process the starch in the rice grains can be completely gelatinized. Generally, the second steaming for about 15 minutes to about 2 hours is sufficient to accomplish an essentially complete gelatinization of the rice grains.

It has been known that complete gelatinization of the rice grains cannot be attained with mere steaming under atmospheric pressure, while, according to the method of the invention the starch in the raw rice can be completely gelatinized without causing browning and caking of the rice by the particular sequence of steaming processes as described above.

The gelatinized rice grains are then subjected to drying with a hot air of about 30° to about 100° C. (Step 5). The drying operation may be carried out, for example, by subjecting the gelatinized rice grains to a stream of air heated to a temperature of about 30° to about 100° C., preferably about 50° to about 90° C. while the rice grains are agitated. This drying operation should be continued until the moisture content of the rice grains decreases to about 8 to about 20%, more advantageously about 10 to about 19%. As will be clear from the results of Test 2 to be described hereinafter, there is a close correlation among the three steps, i.e. the step of completely gelatinizing the rice grains, the step of drying the gelatinized rice and the step of expanding the dried grains, and even when the rice grains have been completely gelatinized the final product is relatively poor in quality and the objects of the invention cannot be fully accomplished, if the rice grains which have been dried to a moisture content outside the above range is subjected to the subsequent operation of expansion.

Thus, gelatinized and dried rice grains are then expanded by subjecting to a stream of air heated up to a temperature of about 200° to about 400° C. (Step 6). As the hot air to be employed in this step, there may be employed a hot air which is heated indirectly, or a hot air which is generated directly by the burning of a suitable fuel such as liquid gas, e.g. liquid propane, liquid butane, natural gas, coal gas, kerosene and the like. The expansion is preferably conducted while the grains are suspended in a stream of the hot air. Practically, the dried and gelatinized grains are poured into an apparatus through which the hot air is forced from the bottom at such a velocity that the grains are continuously tumbled about in the air stream. The rice grains having been poured into the apparatus tumble about in the apparatus and gradually rise to the top of the apparatus as their density becomes attenuated due to expansion and are carried out of the apparatus.

When this treatment is conducted with employment of air below about 200° C., it takes a long time for the final product to be sufficiently rehydrated for serving, in addition to disadvantage that the rehydrated rice will be seriously poor in taste and palatability. On the other hand, use of air at any high temperature beyond about 400° C. results in the undesirable burning taste and coloration. The period of time for this expansion treatment varies with the temperature applied and the desired degree of expansion, but in general the period ranges from about 5 to about 30 seconds.

Thus-obtained products are white in color and have a volume of about 3 to about 6 times of the raw white rice. As the products have been completely pre-cooked they can be served at the table only after rehydration of them and additional cooking is not necessary. Practically, by the addition of boiling water and then keeping at a room temperature or on heating for 3 to 10 minutes, the products are ready to eat.

TEST 1

This test was conducted for comparison of the gelatinization process of the present invention with other gelatinization processes in the yields and flavor of the final products.

1 kg. each of white rice (polished Japanese short grains) was soaked overnight in 1 liter of water containing the following ingredients, and the respective soaked rice samples were subjected to the processes of gelatinization corresponding to Sample No. 1 through No. 5 below. Thereafter, each sample was dried with air heated at 80° C. until its moisture content becomes 16%, thereafter, it was subjected to a stream of air heated at 280° C. for 15 seconds, whereby the rice was caused to expand. In this manner, the following quick-cooking rice samples were prepared.

(A) SAMPLES AND THE GELATINIZATION PROCESSES EMPLOYED FOR THEIR PREPARATION (1) Sample 1: 1 kg. of white rice was soaked overnight in 1 liter of water containing 500 mg. of citric acid and 500 mg. of sodium citrate. The rice was drained and was steamed under atmospheric pressure for 60 minutes.

(2) Sample 2: 1 kg. of white rice was soaked overnight in 1 liter of water containing 500 mg. of citric acid, 500 mg. of sodium citrate, 15 g. of lard and 3 g. of sucrose fatty acid ester (a mixture of sucrose palmitate and sucrose stearate at a ratio of 7:3 by weight). The rice was drained and steamed under atmospheric pressure for 60 minutes.

(3) Sample 3: 1 kg. of white rice was soaked overnight in 1 liter of water containing 500 mg. of citric acid and 500 mg. of sodium citrate. The rice was drained and boiled in 1.5 liters of an aqueous emulsion containing 10 g. of lard and 3 g. of the said sugar fatty acid ester for 25 minutes and kept standing for 30 minutes.

(4) Sample 4: 1 kg. of white rice was soaked overnight in 1 liter of water containing 500 mg. of citric acid and 500 mg. of sodium citrate. The rice was drained and steamed under atmospheric pressure for 15 minutes. The partially gelatinized rice was again soaked in 1.3 liters of water for 5 minutes. The soaked rice was again steamed under atmospheric pressure for 60 minutes.

(5) Sample 5: 1 kg. of white rice was soaked overnight in 1 liter of water containing 500 mg. of citric acid and 500 mg. of sodium citrate. The rice was drained and steamed under atmospheric pressure for 15 minutes. The partially gelatinized rice was again soaked in 1.3 liters of an aqueous emulsion containing 3% of lard and 0.5% of the said sugar fatty acid ester for 5 minutes. The soaked rice was again steamed under atmospheric pressure for 60 minutes.

(B) FINAL YIELDS

TABLE 1

| Sample | Yields, percent | | | | |
|---|---|---|---|---|---|
| | 1 | 2 | 3 | 4 | 5 |
| Caked rice | 0.8 | 0.5 | 25.0 | 16.4 | 1.0 |
| Crushed rice | 2.3 | 2.0 | 2.0 | 2.3 | 2.5 |
| Marketable product | 96.9 | 97.5 | 73.0 | 81.3 | 96.5 |

(C) FLAVOR OF SAMPLES 90 g. each of Samples 1 through 5 was admixed with 200 ml. of boiling water and heated for 3 minutes on a frying pan. The paired preference tests were carried out by the paired sample test method. (panel: 20 persons) between each two samples among the resultants.

The results are summarized in Table 2.

TABLE 2

| Sample | Number of persons who preferred the sample specified below to the sample in the first column | | | | |
|---|---|---|---|---|---|
| | 1 | 2 | 3 | 4 | 5 |
| Sample: | | | | | |
| 1 | | 11 | [1]17 | [1]17 | [1]18 |
| 2 | 9 | | [1]18 | [1]18 | [1]17 |
| 3 | 3 | 2 | | 12 | 13 |
| 4 | 3 | 2 | 8 | | 11 |
| 5 | 2 | 3 | 7 | 9 | |

[1] Significant at 1% level.

As clearly shown by Tables 1 and 2, Samples 3 and 4 contained a much larger amount of caked rice than Sample 5 which had been gelatinized by the gelatinization process of the present invention, while, Samples 1 and 2 were far inferior in their flavor to Sample 5. The panelists pointed out that there were many hard cores in the cooked rice from Samples 1 and 2.

Thus the results demonstrate that the gelatinization process of the present invention is superior to the other gelatinization processes.

TEST 2

This test is to evaluate the influences of the moisture content of the rice after the drying step on the final product.

4 kg. of white rice (polished Japanese short grains) was soaked overnight in 4 liters of water at a room temperature. The soaked rice was steamed under atmospheric pressure for 15 minutes. Immediately thereafter, the rice was soaked in 6 liters of an aqueous emulsion containing 3% of lard and 0.5% of sugar fatty acid ester (a mixture of sucrose palmitate and sucrose stearate at a ratio of 7:3 by weight) for 5 minutes. The soaked rice was then steamed under atmospheric pressure for 60 minutes.

Each 0.9 kg. of thus completely gelatinized rice was dried with air heated at 80° C. to the respective moisture contents illustrated in Table 3 and each of thus dried rice samples was subjected to a stream of the air heated at 300° C. for 15 seconds to give a quick-cooking rice.

90 g. each of thus-prepared quick-cooking rice was mixed with 200 ml. of boiling water and the resultant mixture was heated for 3 minutes. Each sample of the resulting cooked rice was served for the panel consisting of 30 persons to judge whether these samples are favorite as a cooked rice. The results are summarized in Table 3.

TABLE 3

| | | Flavor of the cooked rice prepared from the corresponding quick-cooking rice | |
|---|---|---|---|
| | Moisture content of the dried rice, percent | Number of persons who judged favorite | Number of persons who judged not favorite |
| Sample No.: | | | |
| 1 | 7 | 9 | 21 |
| 2 | 9 | 16 | 14 |
| 3 | 11 | 20 | 10 |
| 4 | 13 | 23 | 7 |
| 5 | 15 | 24 | 6 |
| 6 | 17 | 22 | 8 |
| 7 | 20 | 16 | 14 |
| 8 | 22 | 9 | 21 |
| 9 | 25 | 7 | 23 |

The results demonstrate that the products prepared from the gelatinized rice grains which were dried to a moisture content of 7%, 22% or 25% are poor in their taste because the panelists, more than half the members judged those not favorite (significant statistically).

EXAMPLE 1

1 kg. of white rice (polished Japanese short grains) washed with water and is soaked overnight in 1 liter of water containing 500 mg. of citric acid and 0.4% of a mixture of sodium metaphosphate, sodium polyphosphate and sodium pyrophosphate (88:9:3 by weight) at a room temperature. The rice is drained and the rice (moisture content of 26%) is steamed under atmospheric pressure for 15 minutes. The partially gelatinized rice (moisture content of 30%) is then soaked in 1.3 liters of an aqueous emulsion containing 3% of lard and 0.3% of glycerin monostearate for 5 minutes. The soaked rice (moisture content of 54%) is again steamed under atmospheric pressure for 60 minutes. Thus gelatinized rice grains (moisture content of 58%) are subjected to a stream of the air heated at 80° C. until their moisture content decreased to 16%. The dried grains are subjected to a stream of the air heated at 280° C. for 15 seconds to give a quick-cooking rice (moisture content of 6%) which is white in color and has a volume of about 5 times of that of the raw white rice.

The product can be rapidly prepared for the table. For instance, samples of the product are prepared for eating by the following treatments:

(a) 90 g. of the product is mixed with 200 ml. of boiling water to give cooked rice which is substantially comparable with a satisfactorily boiled rice in an ordinary manner in both flavor and palatability.

(b) 90 g. of the product is mixed with 200 ml. of boiling water and a seasoning composition consisting of 3.0 g. of table salt, 0.5 g. of monosodium glutamate, 0.1 g. of disodium 5'-ribonucleotide, 0.05 g. of garlic, 0.1 g. of dried spring onion, 1.0 g. of dried mushroom (*Cortinellus shiitake*), 10.0 g. of powdered fat, 0.1 g. of yeast extract, 0.5 g. of sugar, 0.2 g. of onion, 0.1 g. of pepper, 0.94 g. of powdered egg yolk and 0.5 g. of dried shrimp. The resulting mixture is heated for 3 minutes on a frying pan to give a seasoned cooked rice which is substantially identical with a satisfactorily cooked seasoned rice in an ordinary manner.

EXAMPLE 2

1 kg. of white rice (polished Taiwan short grains) is washed with water and soaked overnight in 1 liter of water containing 500 mg. of citric acid and 1 mg. of protease at a room temperature. The rice is drained and the rice (moisture content of 25%) is steamed under atmospheric pressure for 15 minutes. Immediately thereafter, the rice (moisture content of 29%) is soaked in 3 liters of an aqueous emulsion containing 3% of soy bean oil, 0.5% of sugar fatty acid ester (a mixture of sucrose palmitate and sucrose stearate at a ratio of 7:3 by weight) for 3 minutes. The soaked rice (moisture content of 52.5%) is then again steamed under atmospheric pressure for 60 minutes. The resulting gelatinized rice (moisture content of 57%) is subjected to a stream of the air heated at 80° C. until its moisture content decreases to 12%. The dried rice is subjected to a stream of the air heated at 250° C. for 15 seconds to give a quick-cooking rice (moisture content of 5%) which is white in color and has a volume of about 4.5 times as much as the raw white rice.

The product remains substantially unchanged in quality after a year of storage at room temperature.

Having thus disclosed the invention, what is claimed is:

1. A process for preparing a quick-cooking rice which comprises a series of steps:
   (1) soaking raw white rice in an aqueous medium until its moisture content falls within a range from about 25 to about 35%;
   (2) steaming the soaked rice under atmospheric pressure for about 5 minutes to about 1 hour thereby partially gelatinizing the soaked rice;
   (3) soaking the partially gelatinized rice in an aqueous medium until its moisture content falls within a range from about 45 to 59% and applying in this step about 0.03 to about 3% of an edible oil, a surfactant or a mixture thereof to the rice;
   (4) steaming the soaked rice under atmospheric pressure until it is completely gelatinized;
   (5) drying the gelatinized rice grains with a stream of air heated at about 30° to about 100° C. to a moisture content range from about 8 to about 20%; and
   (6) expanding the dried rice grains with a stream of air heated at a temperature from about 200° to about 400° C. for a period of time sufficient to increase the volume of said rice to about 3 to 6 times that of the raw rice.

2. A process according to claim 1, wherein the soaking of Step (1) is carried out in an aqueous medium containing a chelating agent in a concentration of about 0.01 to about 2%.

3. A process according to claim 2, wherein the chelating agent is selected from the group consisting of citric acid, pyrophosphoric acid, polyphosphoric acid, metaphosphoric acid, an edible salt thereof and a mixture thereof.

4. A process according to claim 1, wherein the soaking of Step (3) is carried out in an aqueous emulsion of the edible oil, a surfactant or a mixture thereof.

5. A process according to claim 4, wherein the concentration of the edible oil, a surfactant or a mixture thereof in the aqueous emulsion is about 0.1 to about 10%.

6. A process according to claim 1, wherein the soaking of Step (3) is continued until the moisture content of the rice falls within a range from about 50 to about 55% and the amount of the edible oil, a surfactant or a mixture thereof absorbed on the rice falls within a range from about 0.1 to about 1%.

7. A process according to claim 1, wherein the drying of Step (5) is carried out with the air heated at about 50° to about 90° C.

8. A process according to claim 1, wherein the drying of Step (5) is continued until the moisture content of the rice falls within a range from about 10 to about 19%.

References Cited
UNITED STATES PATENTS

| | | | |
|---|---|---|---|
| 2,715,579 | 8/1955 | Roberts | 99—80 |
| 2,740,719 | 3/1956 | Ozai-Durrani | 99—80 |
| 2,890,957 | 6/1959 | Seltzer | 99—80 |

RAYMOND N. JONES, Primary Examiner